(12) United States Patent
Durif

(10) Patent No.: US 6,598,643 B2
(45) Date of Patent: Jul. 29, 2003

(54) WIRELESS BEAD FOR A TIRE

(75) Inventor: Pierre Durif, Enval (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/989,916

(22) Filed: Nov. 21, 2001

(65) Prior Publication Data

US 2002/0046792 A1 Apr. 25, 2002

Related U.S. Application Data

(63) Continuation of application No. PCT/EP00/04266, filed on May 11, 2000.

(30) Foreign Application Priority Data

May 25, 1999 (FR) .............................. 99 06612

(51) Int. Cl.$^7$ .......................... B60C 15/00; B60C 15/06
(52) U.S. Cl. ...................... 152/543; 152/539; 152/550
(58) Field of Search ................ 152/550, 543, 152/539

(56) References Cited

U.S. PATENT DOCUMENTS 3,826,297 A    7/1974   Alderfer
3,946,785 A    3/1976   Powers et al.
6,523,591 B1 * 2/2003  Billieres et al. ........ 152/539 X

FOREIGN PATENT DOCUMENTS

FR         2771050        5/1999

* cited by examiner

Primary Examiner—Adrienne C. Johnstone
(74) Attorney, Agent, or Firm—Baker Botts LLP

(57) ABSTRACT

A tire for mounting on a rim, the flanges of which have rounded rim hooks, has at least two beads and a carcass reinforcement formed of at least one ply of reinforcement elements. Each bead is devoid of a bead wire. The carcass reinforcement has in each bead a meridian profile which is curved axially and radially from the outside to the inside to form an axially inner edge located at an angle open axially and radially towards the inside. The carcass reinforcement is reinforced in each bead at least radially to the outside and axially to the inside, firstly by at least one first continuous additional layer, formed of inextensible circumferential reinforcement elements and secondly by at least one second continuous additional layer, formed of inextensible, radial reinforcement elements the two additional layers having meridian profiles substantially parallel to the meridian profile of the carcass reinforcement in the bead.

22 Claims, 1 Drawing Sheet

WIRELESS BEAD FOR A TIRE

This is a continuation of pending PCT/EP00/04266, filed May 11, 2000 and published in French as WO 00/71366 on Nov. 30, 2000.

BACKGROUND OF THE INVENTION

The invention relates to a tire comprising at least one tread joined to two beads by means of two sidewalls and a carcass reinforcement, said tire being able to be used with or without an independent inner tube and being intended, after mounting on a standardized rim and after inflation, to be fitted on any vehicle capable of rolling.

Application FR A 2 771 150, filed Nov. 14, 1997, describes a tire which is intended to be mounted on a rim of axial width L, with rim seats forming an angle $\gamma$ with the axis of rotation such that $0° \leq \gamma \leq 16°$, and rim flanges with rounded hooks. Said tire comprises a tread joined to two beads by two sidewalls and at least one carcass reinforcement formed of at least one ply of reinforcement elements, each bead being devoid of a bead wire, and said carcass reinforcement having in each bead a meridian profile which is curved axially and radially from the outside to the inside to form an axially inner edge located in an angle $\alpha$ open axially and radially towards the inside, one of the sides of which is parallel to the axis of rotation, and of a value of at most 25°. Said carcass reinforcement is reinforced in each bead, at least radially to the outside and axially to the inside, by at least one first continuous additional layer of meridian profile substantially parallel to the meridian profile of said carcass reinforcement in the bead and comprising at least one first section composed of at least one ply formed of inextensible reinforcement elements forming an angle of between −2.5° and +2.5° with the circumferential direction, the radially upper end of said additional ply being distant from the axis of rotation by an amount at least equal to 0.96 times the distance between said axis and that point of the corresponding flange of the mounting rim which is farthest from said axis of rotation, and the axially inner end being distant from the equatorial plane by an amount at most 0.43 times the width L of the mounting rim.

It is then possible better to control the distribution of the contact pressures between the rim and the tire at the level of the respective rim and bead seats while permitting an improvement in the resistance to unwinding of the carcass reinforcement in the event of a high degree of heating of the beads without using anchoring bead wires for the carcass reinforcement.

In the case of tires having a high recommended inflation pressure, the document cited mentions that the first additional layer may be formed of two sections of several additional plies of inextensible reinforcement elements, superposed on one another, the lengths of which may or may not be the same. The presence of another continuous additional reinforcement layer arranged radially to the inside and axially to the outside has proved very advantageous. Said layers are for the most part formed of inextensible cables, preferably metal ones, forming an angle of between −2.5° and +2.5° with the circumferential direction.

Although such structures make it possible to solve the problems posed, they do not have sufficient endurance, owing to the appearance and propagation of breaks in the carcass reinforcement due to the variation of curvature of the meridian profile of said reinforcement during travel, which variation is between the curvature when the meridian in question passes into the contact ellipse and when it is opposite to said ellipse.

SUMMARY OF THE INVENTION

In order to overcome said problems of endurance, the tire according to the invention, which is intended to be mounted on a rim, the seats of which form an angle $\gamma$ with the axis of rotation such that $0° \leq \gamma \leq 16°$, and the rim flanges of which have rounded hooks, comprising a tread joined to two beads devoid of bead wires by two sidewalls and at least one carcass reinforcement formed of at least one ply of reinforcement elements, and having in each bead a meridian profile which is curved axially and radially from the outside to the inside to form an axially inner edge located in an angle open axially and radially towards the inside, one of the sides of which is parallel to the axis of rotation, and of a value of at most 25°, said carcass reinforcement being reinforced in each bead at least radially to the outside and axially to the inside by at least one first continuous additional layer, composed of at least one ply formed of inextensible reinforcement elements forming an angle of between −2.5° and +2.5° with the circumferential direction, is characterized in that said carcass reinforcement is also, radially to the outside and axially to the inside, reinforced by a second continuous additional layer, composed of at least one ply formed of inextensible radial reinforcement elements, the two additional layers having meridian profiles substantially parallel to the meridian profile of the carcass reinforcement in the bead and the radially upper ends of said first and second additional layers being distant from the axis of rotation by amounts at least equal respectively to 0.96 times and 1.20 times the distance between said axis and that point of the corresponding flange of the mounting rim which is farthest from said axis of rotation.

"Rim flange, viewed in meridian section" is to be understood to mean the assembly formed by the section substantially perpendicular to the axis of rotation extended, firstly, radially to the outside, by a circular section, forming what is sometimes referred to as the rim hook, and secondly, radially to the inside, by the arc of a circle connecting the axially outer end of the rim seat to said assembly.

"Meridian profile of a carcass reinforcement in a bead" is to be understood to mean the meridian profile of the geometric center line of said reinforcement, viewed in meridian section, said profile being considered radially to the inside of a straight line parallel to the axis of rotation of the mounting rim and of the tire passing through the point of the rim hook, corresponding to the bead in question, farthest from the axis of rotation.

"Inextensible reinforcement element" is to be understood to mean a cable or a monofilament having a relative elongation of at most 1.5% under a force of 20% of the breaking load. The first and second additional layers will preferably be formed of metal cables or monofilaments, preferably of steel, in the case of tires of the "heavy vehicle" or "construction" type, but may advantageously be formed of textile elements, preferably of aromatic polyamide, in the case of tires for aeroplanes, agricultural tractors or passenger cars, for example.

The endurance of the tire will be improved further if the thickness of rubber existing between the center line of the meridian profile of the carcass reinforcement and the outer wall of the bead, over the length of contact between the bead and the rim, is reduced by the length of contact between the bead and rim seats respectively, which is at least equal to 0.02% of the maximum axial width of the carcass reinforcement.

A large number of rims and tires may be covered by the invention; the meridian profile of the assembly formed by the carcass reinforcement and the additional layers, which profile is very closely linked to the profile of the carcass reinforcement, will, within a bead, be advantageously adapted to the meridian profile of the rim on which said bead will be mounted. The meridian profile of the additional plies in effect does not differ from the meridian profile of the carcass reinforcement, except by the possible variation of the rubber decoupling layer(s), whether or not reinforced, existing between the two reinforcements, which explains why said profiles are said to be substantially parallel. The meridian profile of the second additional layer may be strictly parallel to the profile of the carcass reinforcement, with a single layer of rubber of constant thickness separating the two profiles. The meridian profile of the second layer may be substantially parallel to the profile of the carcass reinforcement, with one or more plies of the first additional layer possibly being inserted radially between the carcass reinforcement and the second additional layer, whereas the remaining ply (plies) of the first layer are radially to the outside and axially to the inside of the second additional layer.

Said meridian profile of the carcass reinforcement in a bead may be formed, passing radially and axially towards the inside, possibly by a first, concave, arc of a circle extended tangentially by a second, convex, arc of a circle, said second arc of a circle possibly being extended tangentially by a straight line segment.

The radially outer end of the first, concave, arc of a circle is firstly radially distant from the axis of rotation by an amount equal to the radius of the circle which is the geometric locus of the points of the rim flange which are farthest from said axis, and secondly axially distant from the equatorial plane by an amount which lies between two values, the rim width increased by 10% of said width and the rim width reduced by 10% of said width. Said radially outer end is also the point of tangency with the convex meridian profile of the carcass reinforcement in the sidewall. The center of curvature of the first arc of a circle, relative to the two axes which are the trace of the equatorial plane and the axis of rotation, has the same coordinates as the center of curvature of the rim hook. As for the length of said first arc of a circle of the carcass reinforcement profile, it is at the least zero, the meridian profile of the carcass reinforcement in the bead beginning directly with the second, convex, arc of a circle and at the most equal to the length of an arc of a circle the radially lower end of which would be the point of tangency of said arc with a line perpendicular to the axis of rotation.

Said first arc of a circle is tangentially extended radially and axially to the inside by a second arc of a circle of a radius of curvature which may be between a minimum value of 5 mm and a maximum value equal to the radius of curvature of the meridian profile of the carcass reinforcement in the sidewall measured at the point of tangency between said profile and the first arc of a circle, said maximum value being the value of radius used preferably when the first arc of a circle has a length of zero.

The second arc of a circle is possibly tangentially extended radially and axially to the inside by a straight line segment, the axially inner end of which is also the end of the meridian profile of the carcass reinforcement. The axially inner edge of the meridian profile is composed either of part of the second arc of a circle to which the straight line segment is added, or of part of an arc of a circle. Said edge is the part of the meridian profile located in an angle defined by a half line forming a tangent to the second arc of a circle and forming with the axis of rotation an angle of 25° and a half line parallel to said axis of rotation, the origin of which is precisely the point of tangency of the second arc of a circle with the half line oriented at 25°.

The first additional layer has an axially inner end which may be closer to or farther away from the equatorial plane than the axially inner end of the carcass reinforcement. Between its axially inner end and the vertex of the angle in which the edge of the meridian profile of the carcass reinforcement is located, the first additional layer may be separated from the second additional layer by a small thickness of rubber mix, a total of the respective two thicknesses of the calendering layers of the two adjacent plies, whereas between said vertex and the radially upper end said thickness is between 1.0 and 1.8 times the thickness previously mentioned. As for the second additional layer, its axially inner end is distant axially from the equatorial plane by an amount substantially equal to the axial distance between the axially inner end and the carcass reinforcement in the bead. Between its radially upper and axially inner ends, said second additional layer is advantageously separated from the carcass reinforcement and/or the first additional layer by a thickness which is the total of the two thicknesses of the calendering layers of the adjacent layers.

In the case of a high inflation pressure, the presence of a third continuous additional reinforcement layer may also prove very advantageous. Said third layer, axially to the outside and radially to the inside of at least the radially innermost and axially outermost ply of the carcass reinforcement, also has a meridian profile substantially parallel to the meridian profile of said carcass reinforcement in the bead. Said layer is formed of at least one ply of reinforcement elements. It may be continuous and homogenous over its entire length from its radially upper end which may be located radially to the outside, but preferably radially to the inside, of the straight line parallel to the axis of rotation of the rim and passing through that point of the rim flange, corresponding to the bead in question, which is farthest from the axis of rotation, to its axially inner end closest to the equatorial plane. It is then advantageously formed of inextensible cables, preferably metal ones, forming an angle of between −2.5° and +2.5° with the circumferential direction.

In the case in which its radially upper end is radially to the inside of the straight line parallel to the axis of rotation and passing through that point of the rim flange which is farthest from said axis of rotation, said third additional layer may also be nonhomogenous over its width, although continuous, and it is then advantageously formed of two sections: a first section included between its radially upper end and a point located between the center of the second arc of a circle of the meridian profile of the carcass reinforcement in the bead and the vertex of the angle in which the edge of the carcass reinforcement is located, and a second section, extending the first section axially to the inside and radially to the inside and included between said point and its radially lower end axially closest to the equatorial plane. The first section is formed of at least one ply of inextensible cables, preferably metal ones made of steel, forming an angle of between −2.5° and +2.5° with the circumferential direction, while the second section is advantageously formed of at least one ply of reinforcement elements, said ply having the properties of being only very slightly compressible in the transverse direction and advantageously extensible in the circumferential direction, which, firstly, permits simple and reproducible control of the pressures exerted by the bead seat on the rim seat, the inventors having unexpectedly noted that said pressures were a function of the resistance to tension of the reinforcement elements constituting the ply (plies) of the second section of the second additional layer, and, secondly, facilitates the laying during manufacture of said additional layer.

Said second section may advantageously be formed of at least one ply:

- either of continuous, circumferential reinforcement elements, preferably metal ones referred to as "elastic", that is to say, having a relative elongation of at least 1.5% under a tensile force equal to 20% of the breaking load;
- or of undulating or zigzag reinforcement elements of circumferential average orientation, preferably metal ones;
- or of rows of discontinuous, circumferential reinforcement elements, preferably metal ones, each element having a circumferential length which may be between 0.1 and 1 times the circumferential length of the ply and the spaces between elements being offset meridianly relative to the spaces of the axially adjacent rows and said elements or rows of elements, however in this case being parallel to each other and practically adjoining in the transverse direction;
- or of metal reinforcement elements oriented at an angle of at least 80° relative to the circumferential direction, said elements being circumferentially separated from each other by a distance of at least 0.2 mm.

Furthermore, the laying of the second section of the third layer may be facilitated further if the ply (plies) of said section are formed of strips of several circumferential reinforcement elements, which strips are circumferentially discontinuous, the discontinuity gaps between strips forming with the circumferential direction an angle which is different from the angle formed with the same direction by the reinforcement elements of the carcass reinforcement, the difference being at least 10°.

The position of the third layer and the plies which make it up may be a function of the number of plies forming the carcass reinforcement of the tire. If said carcass reinforcement is formed of at most three plies, the third additional layer is preferably located in its entirety axially to the outside and radially to the inside of the carcass ply which is radially farthest to the inside and axially farthest to the outside of the carcass reinforcement. On the other hand, if said carcass reinforcement is formed of at least four plies, the plies forming the third additional layer are preferably such that two of them tightly surround a group of carcass plies which may be formed of one or more carcass reinforcement plies.

The characteristics and advantages of the present invention will be better understood with reference to the following description which refers to the drawings.

DETAILED DESCRIPTION OF THE INVENTION

Figure 1:
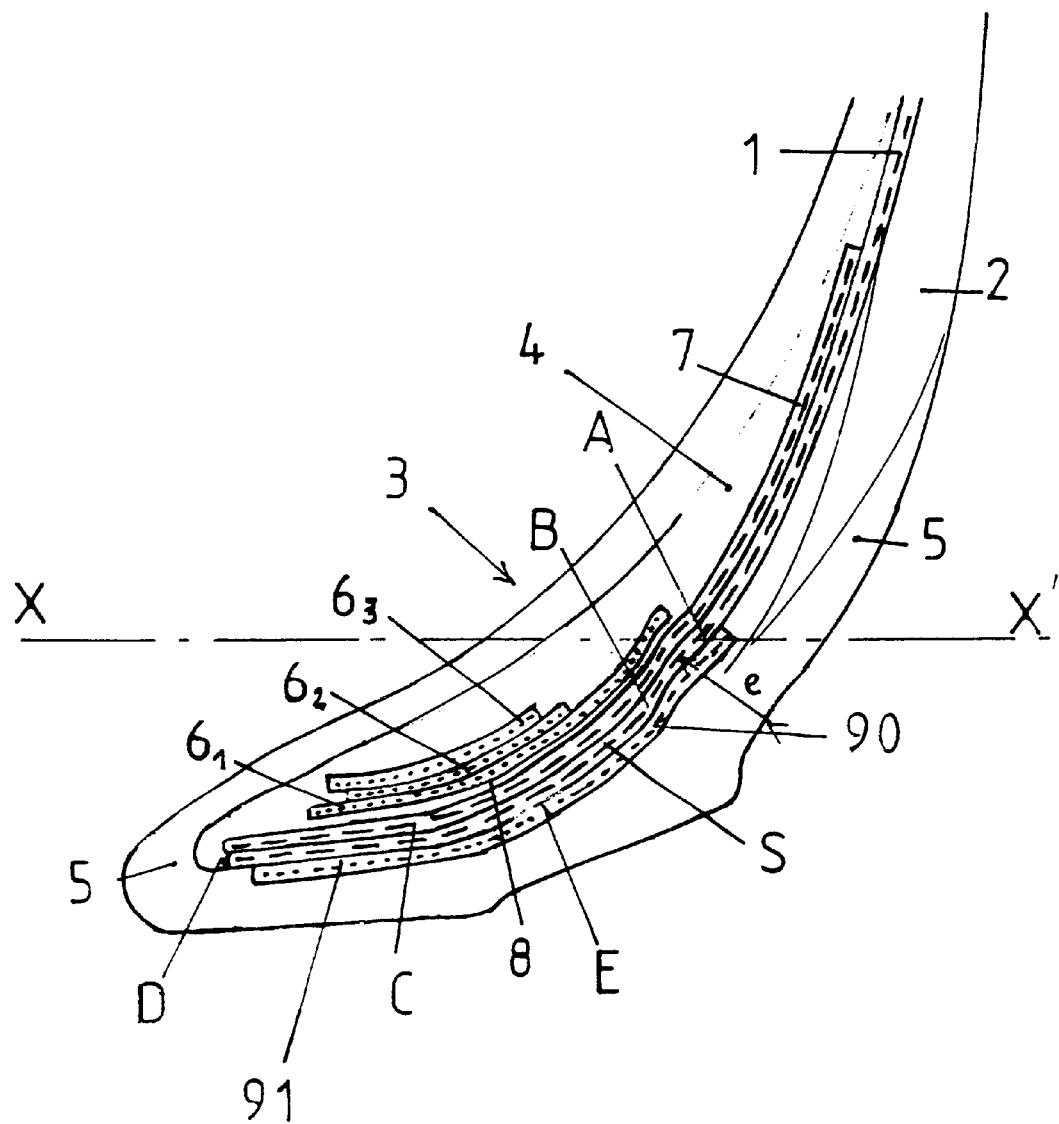
FIG. 1 is a schematic, viewed in meridian section, of a bead of a "heavy vehicle" tire embodying the invention.

The "heavy vehicle" tire of dimension 385/65 R 22.5 (FIG. 1), intended to be mounted on a drop center rim having rim seats inclined at 15°, comprises a tread joined to two beads 3 by two sidewalls 2. A carcass reinforcement, formed of a single ply 1 of radial metal cables, made of steel, reinforces said tire, and is surmounted by a crown reinforcement (not shown) formed of at least two plies of metal cables made of steel which are parallel to each other in each ply and are crossed from one ply to the next, forming angles of between 10° and 35° with the circumferential direction.

The meridian profile of the geometric center line of the carcass ply 1, viewed in meridian section, said profile being considered radially to the inside of a straight line XX' parallel to the axis of rotation of the mounting rim and of the tire passing through the point of the rim flange, corresponding to the bead in question, farthest from the axis of rotation, is formed by a first, concave, arc of a circle AB, forming a tangent at A to the meridian profile of the carcass reinforcement in the sidewall 2 and at B to a second, convex, arc of a circle BC, which itself is extended tangentially and axially to the inside by a straight line segment CD forming an angle of 20° with the axis of rotation, and D being the end of the carcass reinforcement 1. The point A is distant from the equatorial plane by an amount equal to 149 mm, or 0.5 times the width L of the 11.75 rim on which the tire is mounted, whereas the point D is distant from the same plane by an amount equal to 0.3 times the same rim width. The arc of a circle AB, as can be seen in the figure, is not of the maximum possible length, owing to the specific form of the meridian profile of the flange of the 15° seat rim, the point B not being the point of tangency with a straight line perpendicular to the axis of rotation. Said meridian profile is therefore curved axially and radially from the outside to the inside to form an axially inner edge SD, located in an angle which is open axially and radially towards the inside, one of its sides forming an angle of 25° with the axis of rotation, being at a tangent to the second arc of a circle BC at S, and its other side, starting from S, being parallel to said axis of rotation.

The first radially outer and axially inner additional layer 6 is composed of three plies $6_1$, $6_2$ and $6_3$ of metal 68×23 cables made of steel, oriented circumferentially, the breaking load of which is at least 700 daN. The radially lower ends of the three plies are farther from the equatorial plane than the end of the carcass ply and the radially stepped radially upper ends are radially to the inside of the straight line XX', except for the ply $6_1$ which is closest to the carcass ply 1.

Between said carcass ply 1 and the additional ply $6_1$ of the first additional layer 6 there is arranged a second additional layer 7 formed of a single ply 7, in the example described, of radially oriented metal 19×18 cables made of steel. The radially upper end of said ply 7 is located radially above the straight line XX' to be located approximately between said straight line and the straight line of greater axial width of the carcass reinforcement 1. As for the axially inner end, it is located at an axial distance from the equatorial plane which is equal to the axial distance between said plane and the end of the carcass ply 1. The additional ply $6_1$ is decoupled from the second additional layer 7 by a thin layer of rubber mix 8, the thickness of which is equal to the total of the two thicknesses of calendering mix respectively covering the cables of said additional plies, and in the case described equal to 0.6 mm. The same applies to the separation between the second additional layer 7 and the carcass reinforcement 1, which are decoupled from each other by the rubber 8 of a thickness of 1.2 mm.

The third additional layer 9 is formed of two sections:

- a first section 90, extending from the point A to a point E of the meridian profile of the carcass reinforcement, substantially at equal distances from the points C and S of said profile, and formed of a ply of inextensible metal 68×23 cables made of steel, oriented circumferentially and of a diameter of 2.8 mm; and axially to the inside starting from said point E, a second section 91 formed of a ply of metal cables made of steel which undulate in the plane of the ply and are of circumferential average orientation and have a ratio $a/\lambda$ of amplitude of undulation a to wavelength $\lambda$ of between 0.03 and 0.1, said steel cables being of smaller diameter than that of the cables of the first section 90, since it is equal to 1.4 mm.

All the plies are covered within the bead and radially to the outside by the conventional protective rubber layer 5 intended to establish contact with the mounting rim and possibly by the mix forming the sidewall 2 of the tire. Whatever the arrangement of these mixes in the bead, the thickness e of rubber between the center line of the carcass ply 1 and the outer wall of the bead, over a length equal to the total length of contact between said outer wall of the bead and the inner wall of the mounting rim, is reduced by the common length of the bead and rim seats respectively, equal to 13 mm, that is to say at least equal to 0.034% of the maximum axial width of the carcass reinforcement 1. The length in question corresponds substantially to the length AS of the meridian profile of the carcass reinforcement 1. The entire bead is completed by one or more rubber filler(s) 4 axially to the inside and radially to the outside of the additional layer 6.

I claim:

1. A tire, intended to be mounted on a rim having seats which form an angle $\gamma$ with an axis of rotation such that $0° \leq \gamma \leq 16°$, and rim flanges which have rounded hooks, comprising a tread joined to two beads devoid of bead wires by two sidewalls and at least one carcass reinforcement formed of at least one ply of reinforcement elements, and having in each bead a meridian profile which is curved axially and radially from outside to inside to form an axially inner edge located in an angle open axially and radially towards the inside, one side of the angle is parallel to the axis of rotation, and the angle having a value of at most 25°, said at least one carcass reinforcement being reinforced in each bead at least radially to the outside and axially to the inside by at least one first continuous additional layer, composed of at least one ply formed of inextensible reinforcement elements forming an angle of between –2.5° and +2.5° with the circumferential direction, the tire characterized in that said at least one carcass reinforcement is also, radially to the outside and axially to the inside, reinforced by at least one second continuous additional layer, composed of at least one ply formed of inextensible radial reinforcement elements, the two additional layers having meridian profiles substantially parallel to the meridian profile of the at least one carcass reinforcement in the bead and the radially upper ends of said first and second additional layers being distant from the axis of rotation by amounts at least equal, respectively, to 0.96 times and 1.20 times the distance between said axis and a point of the corresponding rim flange which is farthest from said axis of rotation.

2. A tire according to claim 1, characterized in that the thickness of rubber existing between the center line of the meridian profile of the at least one carcass reinforcement and the outer wall of the bead, over a length equal to the length of contact between the bead and the rim reduced by the common length between the bead and rim seats, respectively, is at least equal to 0.02% of the maximum axial width of the at least one carcass reinforcement.

3. A tire according to claim 2, characterized in that the axially inner end of the at least one second additional ply is distant axially from the equatorial plane by an amount substantially equal to the axial distance between the axially inner end and the at least one carcass reinforcement in the bead.

4. A tire according to claim 3, characterized in that the meridian profile of the at least one carcass reinforcement in a bead is formed, radially and axially towards the inside, by an optional first, concave, arc of a circle AB, extended tangentially at B by a second, convex, arc of a circle BC, said second arc of a circle BC being extended tangentially by an optional straightline segment CD, D being the end of the at least one carcass reinforcement in the bead.

5. A tire according to claim 4, characterized in that the radially outer end A of the first, concave, arc of a circle AB, the point of tangency of said arc AB with the convex meridian profile of the at least one carcass reinforcement in the sidewall, is firstly radially distant from the axis of rotation by an amount equal to the radius of the circle which is the geometric locus of the points of the rim flange which are farthest from said axis, and secondly axially distant from the equatorial plane by an amount of between the rim width increased by 10% of said width and the rim width decreased by 10% of said width, the center of curvature of said arc AB, relative to the two axes which are the trace of the equatorial plane and the axis of rotation, having the same coordinates as the center of curvature of the rim hook.

6. A tire according to claim 4, characterized in that the length of said first arc of a circle AB of the at least one carcass reinforcement profile lies between a zero value, the meridian profile of the at least one carcass reinforcement in the bead beginning directly with the second, convex, arc of a circle BC, and a value at most equal to the length of an arc of a circle the radially lower end B of which is the point of tangency of said arc with a line perpendicular to the axis of rotation.

7. A tire according to one of claims 4 to 6, characterized in that the second arc of a circle BC, which is at a tangent at B to the first arc of a circle AB, has a radius of curvature of between a minimum value of 5 mm and a maximum value equal to the radius of curvature of the meridian profile of the at least one carcass reinforcement in the sidewall measured at the point of tangency A between said profile and the first arc of a circle AB, said maximum value being the value of radius used when the first arc of a circle AB has a length of zero.

8. A tire according to one of claims 4 to 6, characterized in that the axially inner edge of the meridian profile of the at least one carcass reinforcement, composed either of part of the second arc of a circle BC to which the straight line segment CD is added, or of part of the second arc of a circle BC, is the part of the meridian profile located in an angle defined by a half line forming a tangent at S to the second arc of a circle BC and forming with the axis of rotation an angle of 25° and a half line parallel to said axis of rotation, the origin S of which is precisely the point of tangency of the second arc of a circle BC with the half line oriented at 25°.

9. A tire according to claim 1, characterized in that the meridian profile of the at least one carcass reinforcement in a bead is formed, radially and axially towards the inside, by an optional first, concave, arc of a circle AB, extended tangentially at B By a second, convex, arc of a circle BC, said second arc of a circle BC being extended tangentially by an optional straight line segment CD, D being the end of the at least one carcass reinforcement in the bead, the axially inner edge of the meridian profile of the at least one carcass reinforcement, composed either of part of the second arc of a circle BC to which the straight line segment CD is added, or of part of the second arc of a circle BC, is the part of the meridian profile located in an angle defined by a half line forming a tangent at S to the second arc of a circle BC and forming with the axis of rotation an angle of 25° and a half line parallel to said axis of rotation, the origin S of which is precisely the point of tangency of the second arc of a circle BC with the half line oriented at 25°, and the at least one first additional ply, between its axially inner end and the vertex S of the angle in which the axially inner edge of the at least one carcass reinforcement is located, is separated from the at least one second additional by a minimal thickness of rubber mix, which thickness is the total thicknesses of the calendering layers facing the two adjacent first and second plies respectively, whereas between said vertex S and the radially upper end of the at least one first additional ply the separating thickness is between 1.00 and 1.80 times the above minimal thickness.

10. A tire according to claim 9, characterized in that the at least one second additional ply, between its radially upper and axially inner ends, is separated from the at least one carcass reinforcement ply and the at least one first additional ply by a small thickness of rubber mix which is the total of the two thicknesses of the calendering layers facing the adjacent plies.

11. A tire according to claim 1, characterized in that the at least one carcass reinforcement is reinforced, at least axially to the outside and radially to the inside of the radially innermost and axially outermost ply of the at least one carcass reinforcement, by a third continuous additional layer formed of at least one ply of reinforcement elements, having a meridian profile substantially parallel to the meridian profile of said at least one carcass reinforcement in the bead, and composed of inextensible, circumferential reinforcement elements.

12. A tire according to claim 11, characterized in that the radially upper end of the third additional layer is radially to the inside of the straight line XX' parallel to the axis of rotation of the rim and passing through the point of the rim hook, corresponding to the bead in question, which is farthest from said axis of rotation.

13. A tire according to claim 12, characterized in that the third additional layer is of homogenous composition and formed, in its entirety, of inextensible cables forming an angle of between −2.5° and +2.5° with the circumferential direction.

14. A tire according to claim 12, characterized in that the meridian profile of the at least one carcass reinforcement in a bead is formed, radially and axially towards the inside, by an optional first, concave, arc of a circle AB, extended tangentially at B by a second, convex, arc of a circle BC, said second arc of a circle BC being extended tangentially by an optional straight line segment CD, D being the end of the at least one carcass reinforcement in the bead, the axially inner edge of the meridian profile of the at least one carcass reinforcement, composed either of cart of the second arc of a circle BC to which the straight line segment CD is added, or of part of the second arc of a circle BC, is the part of the meridian profile located in an angle defined by a half line forming a tangent at S to the second arc of a circle BC and forming with the axis of rotation an angle of 25° and a half line parallel to said axis of rotation, the origin S of which is precisely the point of tangency of the second arc of a circle BC with the half line oriented at 25°, and the third additional layer is formed of two sections, a first section between its radially upper end and a point located approximately between the center of the arc of a circle BC and the vertex S of the angle in which the axially inner edge of the at least one carcass reinforcement is located, and a second section between said point and its axially inner end, the first section being formed of at least one ply of circumferential, inextensible reinforcement elements, while the second section is formed of at least one ply of reinforcement elements having the properties of being only very slightly compressible in the transverse direction and extensible in the circumferential direction.

15. A tire according to claim 14, characterized in that the reinforcement elements forming the second section of the third additional layer are elastic, continuous, rectilinear reinforcement elements oriented circumferentially, said elements being parallel to each other and adjacent in the transverse direction.

16. A tire according to claim 14, characterized in that the reinforcement elements forming the second section of each ply of the third additional layer are undulating or zigzag reinforcement elements in the plane of the ply and of circumferential average orientation, having a ratio of amplitude of undulation to wavelength between 0.03 and 0.1, said elements being parallel to one another and adjacent in the transverse direction.

17. A tire according to claim 14, characterized in that a ply of the second section of the third additional layer is formed of rows of discontinuous reinforcement elements, each element having a circumferential length between 0.1 and 1 times the circumferential length of the ply which they form, and the gaps between elements being offset meridianly relative to the gaps of the axially adjacent rows, said rows of elements being parallel to one another and adjacent in the transverse direction.

18. A tire according to claim 14, characterized in that the reinforcement elements forming the second section of the third additional layer are metal reinforcement elements oriented at an angle of at least 80° relative to the circumferential direction, said elements being circumferentially separated from each other by a distance of at least 0.2 mm.

19. A tire according to claim 14, characterized in that a ply of the second section of the third additional layer is formed of strips of several circumferential reinforcement elements, said strips being circumferentially discontinuous, and the discontinuity gaps between strips forming with the circumferential direction an angle which is different from the angle formed with the same direction by the reinforcement elements of the at least one carcass reinforcement, the difference being at least 10°.

20. A tire according to claim 11, characterized in that the at least one carcass reinforcement is formed of at most three plies, the third additional layer being located in its entirety axially to the outside and radially to the inside of the radially innermost and axially outermost carcass ply of the at least one carcass reinforcement.

21. A tire according to claim 11, characterized in that the at least one carcass reinforcement is formed of at least four plies, the plies forming the third additional layer such that two of them tightly surround a group of carcass plies formed of one or more carcass reinforcement plies.

22. A tire according to claim 1, characterized in that the carcass reinforcement elements are radial reinforcement elements.

* * * * *

UNITED STATES PATENT AND TRADEMARK OFFICE
CERTIFICATE OF CORRECTION

PATENT NO. : 6,598,643 B2
DATED : July 29, 2003
INVENTOR(S) : Durif, Pierre

It is certified that error appears in the above-identified patent and that said Letters Patent is hereby corrected as shown below:

Column 4,
Lines 32-33, "homogenous" should read -- homogeneous --
Line 47, "nonhomogenous" should read -- nonhomogeneous --

Column 5,
Line 19, "meridianly" should read -- meridionally --

Column 8,
Line 7, "straightline" should read -- straight line --
Line 57, "By" should read -- by --

Column 9,
Line 10, "additional" should read -- additional ply --
Line 41, "homogenous" should read -- homogeneous --
Line 55, "cart" should read -- part --

Column 10,
Line 32, "meridianly" should read -- meridionally --
Line 59, "layer such" should read -- layer being such --

Signed and Sealed this

Fourteenth Day of October, 2003

JAMES E. ROGAN
*Director of the United States Patent and Trademark Office*